United States Patent [19]
Ohsawa

[11] Patent Number: 5,925,122
[45] Date of Patent: Jul. 20, 1999

[54] DATA PROCESSING UNIT WHICH PRE-FETCHES INSTRUCTIONS OF DIFFERENT LENGTHS TO CONDUCT PROCESSING

[75] Inventor: Kazuto Ohsawa, Tokyo, Japan

[73] Assignee: NEC Corporation, Tokyo, Japan

[21] Appl. No.: 08/919,776

[22] Filed: Aug. 29, 1997

[30] Foreign Application Priority Data

Aug. 30, 1996 [JP] Japan ................................. 8-249161

[51] Int. Cl.⁶ ........................................... G06F 9/30
[52] U.S. Cl. ............................................... 712/210
[58] Field of Search .................................. 712/204, 205, 712/207, 210, 214

[56] References Cited

U.S. PATENT DOCUMENTS

| | | | |
|---|---|---|---|
| 5,373,461 | 12/1994 | Bearden et al. | 364/748 |
| 5,481,686 | 1/1996 | Dockser | 395/375 |
| 5,523,961 | 6/1996 | Naini | 364/715.03 |
| 5,666,301 | 9/1997 | Makino | 364/254.01 |
| 5,671,170 | 9/1997 | Markstein et al. | 364/748 |
| 5,764,959 | 6/1998 | Sharangpani et al. | 395/500 |

OTHER PUBLICATIONS

NEC's *User's Manual* for "V810™ 32–BIT Microprocessor", pp. 75 and 76.

"V Series Microcomputer II", edited under the supervision of Ryoichi Mori, Microcomputer Series 18, Maruzen Co., Ltd., p. 33.

"Computer Architecture: A Quantitative Approach", written by Hennessy and Patterson, Mikkei BP, pp. 456–457.

"Computer Organization & Design: The Hardware/Software Interface", written by Patterson and Hennessy, Nikkei BP, pp. 334–335.

*Primary Examiner*—David Y. Eng
*Attorney, Agent, or Firm*—Young & Thompson

[57] ABSTRACT

A data processing unit including instruction queue circuits for pre-fetching instructions from a memory and an immediate generator for receiving input of immediate data of an instruction held by the instruction queue circuits to generate data whose bit size is larger than or equal to that of the immediate data, the instruction queue circuits being provided in duplication for higher-order bits and lower-order bits of the immediate generator and storing the same instructions to apply immediate data of an instruction held in the instruction queue circuit corresponding to higher-order bits of the immediate generator to higher-order bits of the immediate generator and apply immediate data of an instruction held in the instruction queue circuit corresponding to lower-order bits of the immediate generator to lower-order bits of the immediate generator.

11 Claims, 10 Drawing Sheets

[STATE 0] IMMEDIATELY AFTER BRANCHING TO EVEN ADDRESS. INSTRUCTION QUEUE IS EMPTY.

WHEN EXECUTED INSTRUCTION IS OF 16-BIT LENGTH, TRANSITION TO [STATE 2] OCCURS.
WHEN EXECUTED INSTRUCTION IS OF 32-BIT LENGTH, TRANSITION TO [STATE 0] OCCURS.

DIAGRAM OF INSTRUCTION QUEUE AT [STATE 2]

[STATE 2] ODD ADDRESS.
INSTRUCTION QUEUE CONTAINS 16 BITS.

WHEN EXECUTED INSTRUCTION IS OF 16-BIT LENGTH,
TRANSITION TO [STATE 3] OCCURS.
WHEN EXECUTED INSTRUCTION IS OF 32-BIT LENGTH,
TRANSITION TO [STATE 2] OCCURS.

FIG. 10 (PRIOR ART)

[STATE 3] EVEN ADDRESS.
INSTRUCTION QUEUE CONTAINS 32 BITS.

WHEN EXECUTED INSTRUCTION IS OF 16-BIT LENGTH,
TRANSITION TO [STATE 2] OCCURS.
WHEN EXECUTED INSTRUCTION IS OF 32-BIT LENGTH,
TRANSITION TO [STATE 0] OCCURS.

DATA PROCESSING UNIT WHICH PRE-FETCHES INSTRUCTIONS OF DIFFERENT LENGTHS TO CONDUCT PROCESSING

BACKGROUND OF THE INVENTION

1. Field of the Invention

The present invention relates to a data processing unit which receives input of instructions and processes the same and, more particularly, to a data processing unit characterized in a method of structuring instruction queues for pre-fetching instructions of different lengths to conduct processing.

2. Description of the Related Art

Figure 5:
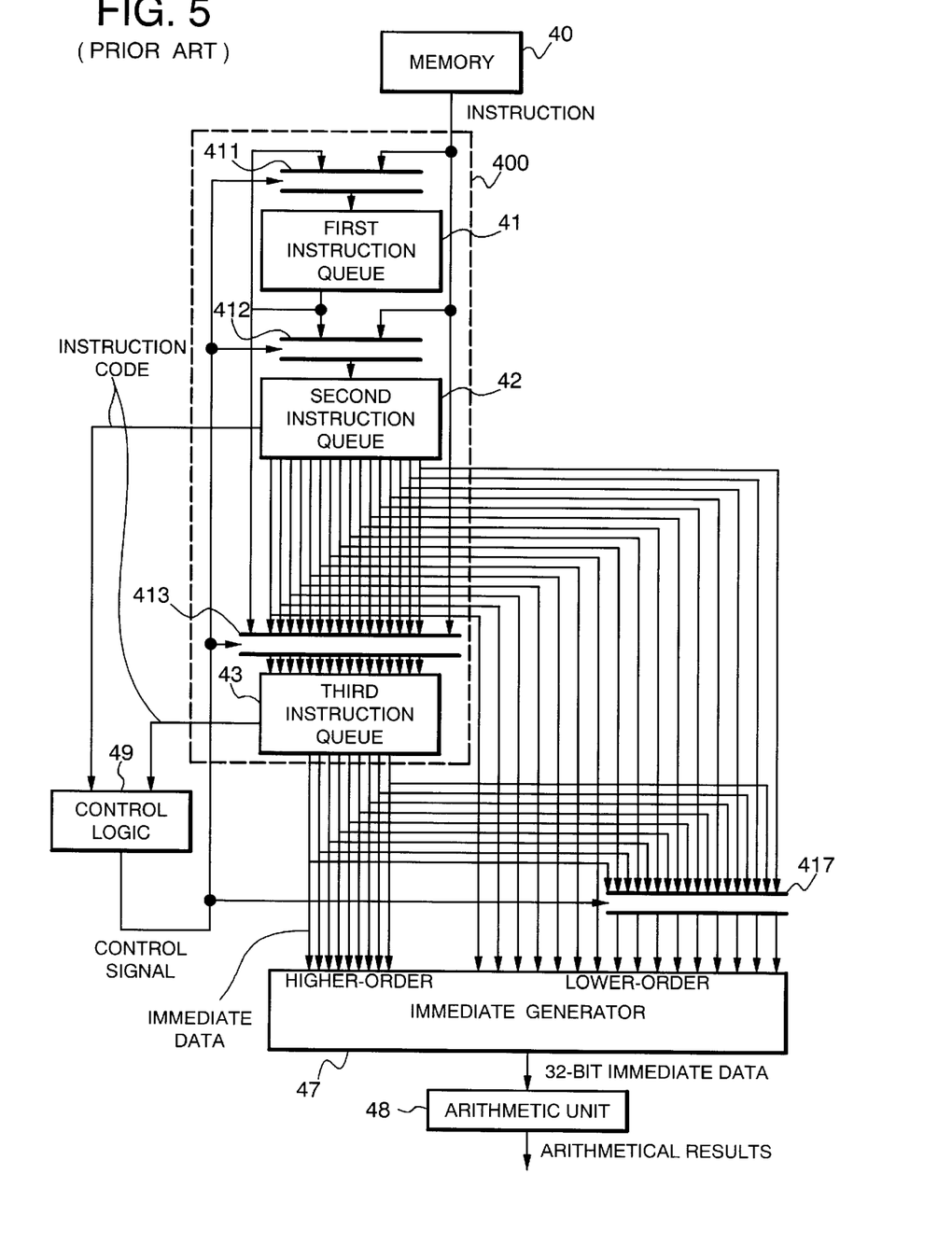
FIG. 5 is a block diagram showing layout of a conventional data processing unit.

FIG. 5 is a block diagram showing layout of structure, from an instruction queue to an immediate generator, of a conventional data processing unit.

As illustrated in FIG. 5, the conventional data processing unit includes an instruction queue circuit 400 comprised of three instruction queues and three selectors, a fourth selector 417, an immediate generator 47, an arithmetic unit 48 and a control logic 49.

In the instruction queue circuit 400, a first instruction queue 41 reads an instruction sent from a first selector 411 and sends the instruction to a second selector 412. A second instruction queue 42 reads an instruction sent from the second selector 412 and sends the instruction to a third selector 413 and the control logic 49, as well as sending immediate data to lower-order bits of the immediate generator 47 and the fourth selector 417. A third instruction queue 43 reads an instruction sent from the third selector 413 and sends the instruction to the control logic 49, as well as sending immediate data to higher-order bits of the immediate generator 47 or the fourth selector 417.

The first selector 411 sends an instruction sent from a memory 40 or the first instruction queue 41 to the first instruction queue 41. The second selector 412 sends an instruction come from the memory 40 or the first instruction queue 41 to the second instruction queue 42. The third selector 413 sends an instruction sent from any of the memory 40, the first instruction queue 41 and the second instruction queue 42 to the third instruction queue 43.

The fourth selector 417 sends immediate data sent from the second instruction queue 42 or immediate data sent from the third instruction queue 43 to lower-order bits of the immediate generator 47. After expanding a code of immediate data received from the fourth selector 417 and from the second and the third instruction queues 42 and 43 of the instruction queue circuit 400 to a bit width of an arithmetical unit of the arithmetic unit 48, the immediate generator 47 sends the immediate data to the arithmetic unit 48. The arithmetic unit 48 receives the immediate data from the immediate generator 47 to perform arithmetic and outputs arithmetical results. The control logic 49 receives instructions from the second instruction queue 42 and the third instruction queue 43 to output signals for controlling output of the first selector 411, the second selector 412, the third selector 413 and the fourth selector 417.

Figure 6:
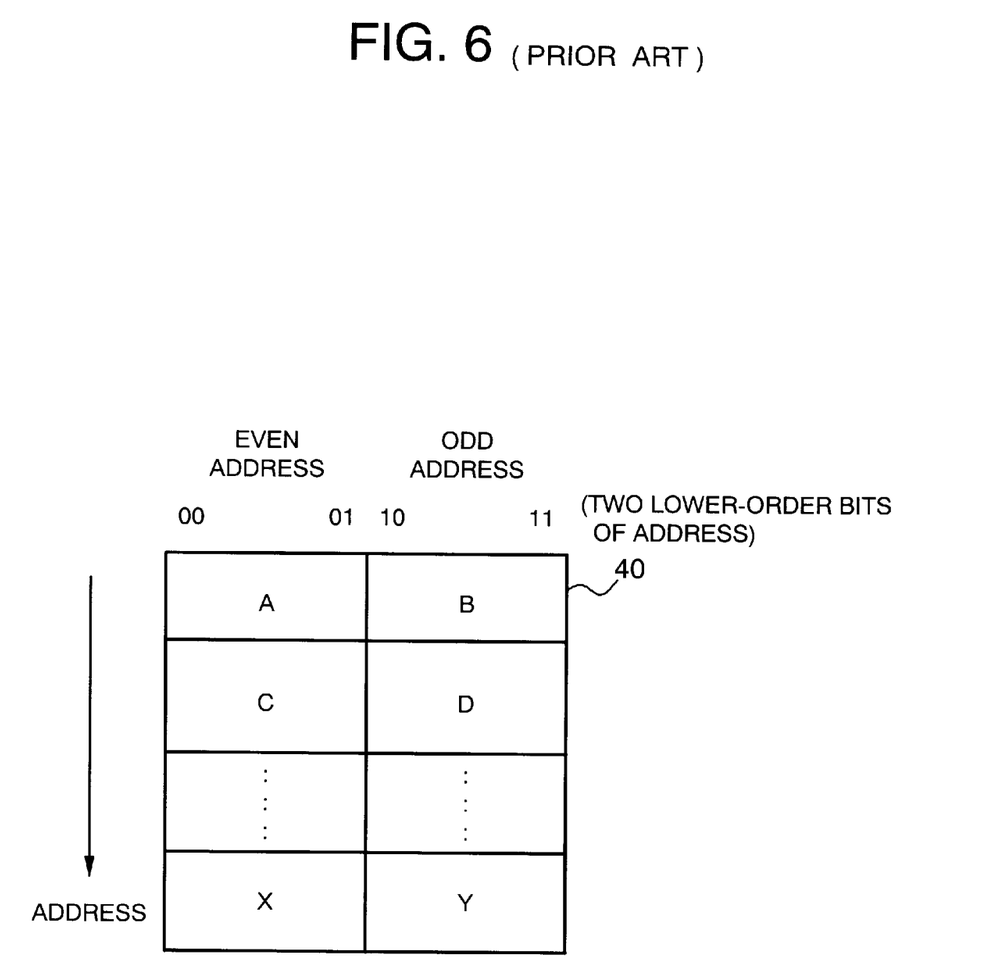
FIG. 6 is a diagram showing a memory map of a data processing unit.

Description will be next made of operation of the above-described conventional data processing unit. It is assumed here that the conventional data processing unit shown in FIG. 5 is capable of processing instructions of different lengths, a 16-bit instruction and a 32-bit instruction, and that an arithmetical unit of the arithmetic unit 48 is 32 bits. It is also assumed that the memory 40 stores instructions in a manner as illustrated in a memory map of FIG. 6. A, B, C, D, . . . , X and Y in FIG. 6 are instructions each divided every 16 bits and one address is assumed to be composed of 8 bits. Even address indicates that a leading address of an instruction is a multiple of 4 and an odd address indicates that a leading address of an instruction is not a multiple of 4.

The instruction queue circuit 400 has four states [state 0], [state 1], [state 2] and [state 3] according to a length of an instruction to be executed. [State 0], [state 1], [state 2] and [state 3] are illustrated in FIGS. 7, 8, 9 and 10, respectively. Switching to each state is conducted by the control of the first selector 411, the second selector 412 and the third selector 413 of the instruction queue circuit 400 by the control logic 49.

Figure 7:
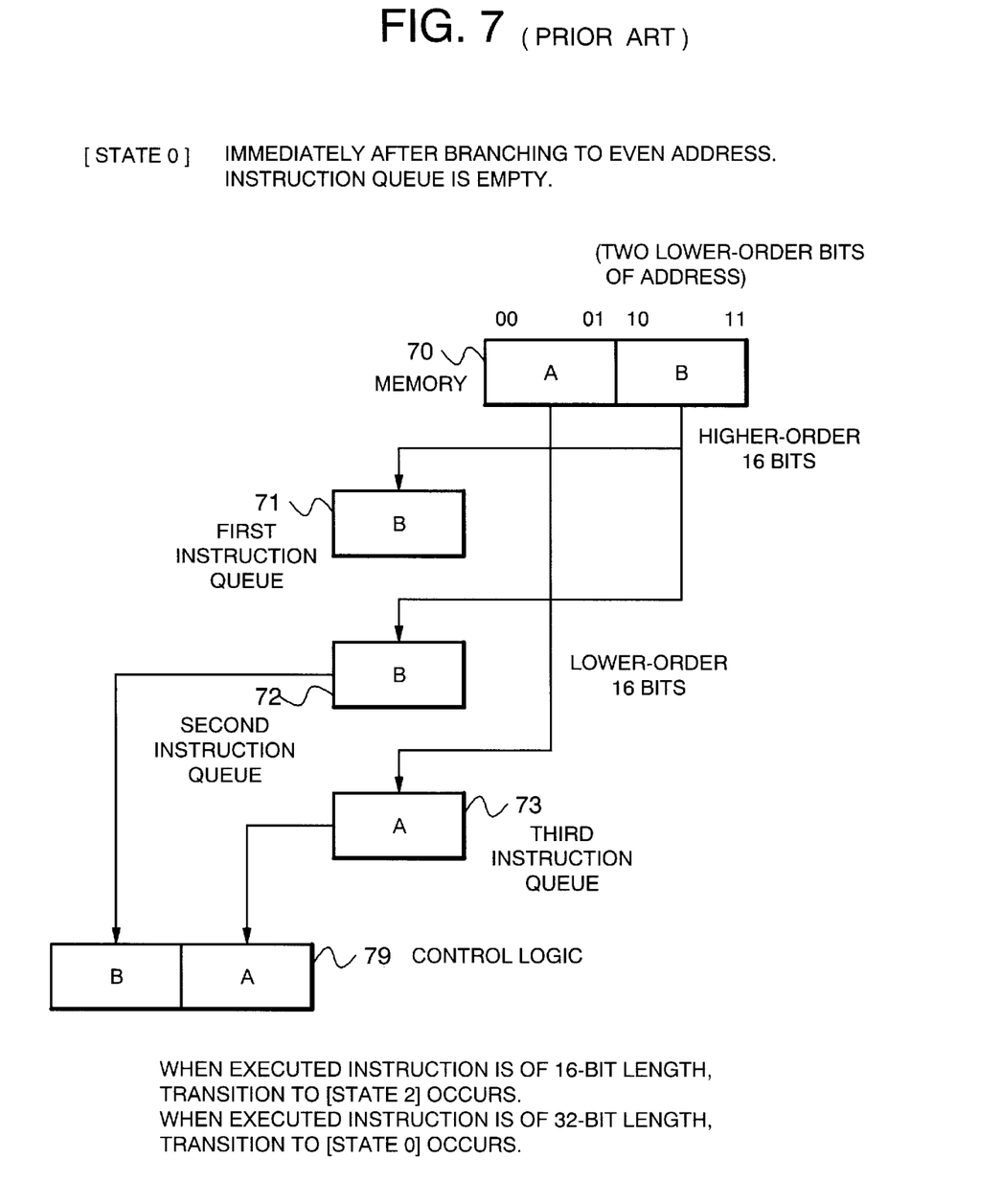
FIG. 7 is a diagram showing an example of state of an instruction queue whose transition occurs according to a length of an instruction to be executed.

According to the memory map example shown in FIG. 6, since the initial address is even-numbered, the instruction queue enters [state 0]. At [state 0], the third instruction queue 43 reads lower-order 16 bits of the memory 40 as illustrated in FIG. 7. The second instruction queue 42 reads higher-order 16 bits of the memory 40. The first instruction queue 41 reads higher-order 16 bits of the memory 40. The control logic 49 reads instructions contained in the second instruction queue 42 and the third instruction queue 43 and identifies the instruction to be executed to determine an address of the memory at which an instruction to be read next resides. Then, if the instruction to be executed is of 16-bit length, transition to [state 2] occurs and if the instruction is of 32-bit length, transition to [state 0] occurs.

Figure 9:
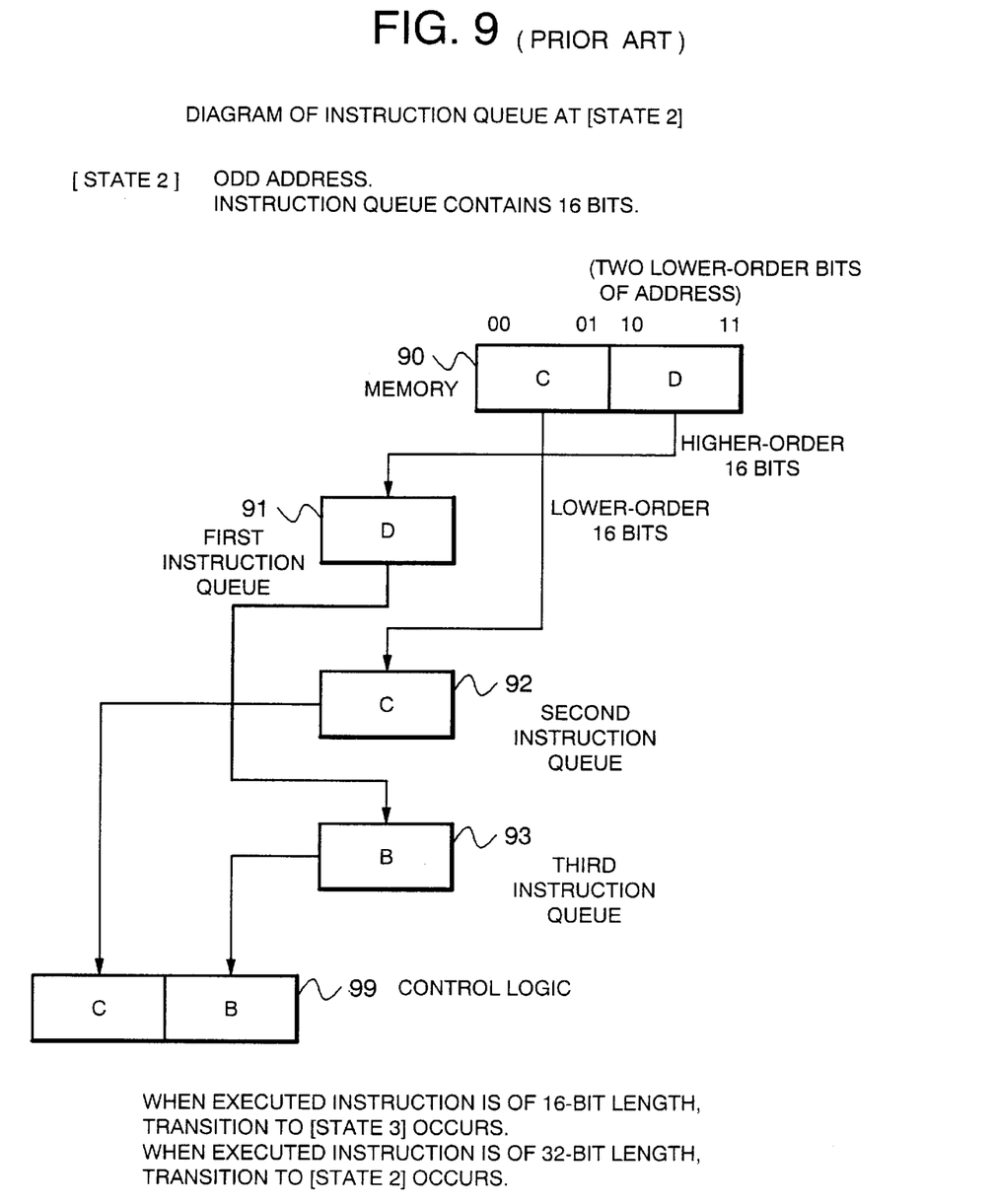
FIG. 9 is a diagram showing an example of state of an instruction queue whose transition occurs according to a length of an instruction to be executed.

It is assumed here that a 16-bit instruction is executed to cause transition to [state 2]. At [state 2], the third instruction queue 43 reads an instruction contained in the first instruction queue 41 as illustrated in FIG. 9. The second instruction queue 42 reads lower-order 16 bits of the memory 40. The first instruction queue 41 reads higher-order 16 bits of the memory 40. The control logic 49 reads instructions contained in the second instruction queue 42 and the third instruction queue 43 and identifies the instruction to be executed to determine an address of the memory at which an instruction to be read next resides. Then, if the instruction to be executed is of 16-bit length, transition to [state 3] occurs and if the instruction is of 32-bit length, transition to [state 2] occurs.

Figure 10:
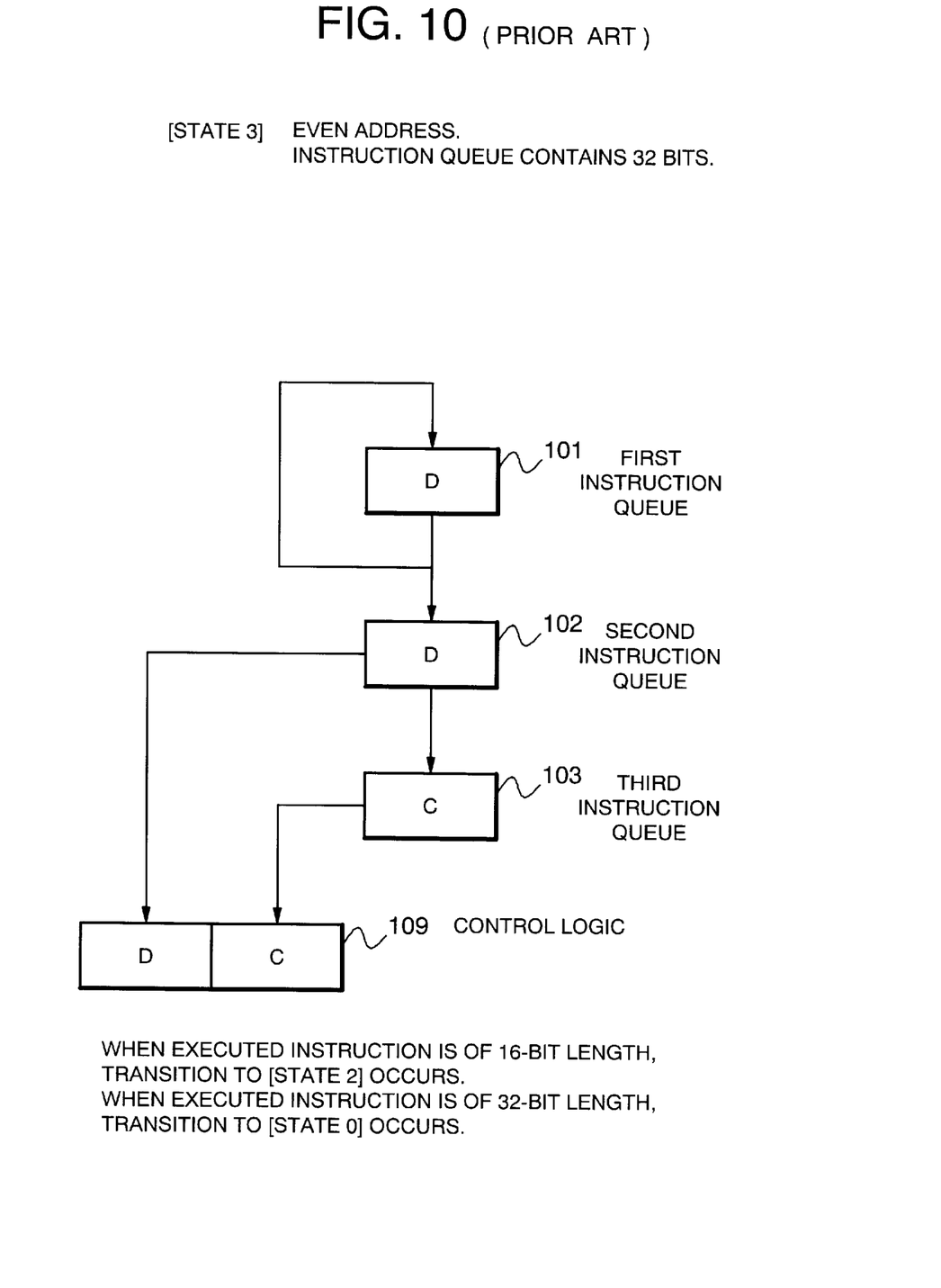
FIG. 10 is a diagram showing an example of state of an instruction queue whose transition occurs according to a length of an instruction to be executed.

It is assumed here that a 16-bit instruction is executed to cause transition to [state 3]. At [state 3], the third instruction queue 43 reads an instruction contained in the second instruction queue 42 as illustrated in FIG. 10. The second instruction queue 42 reads an instruction contained in the first instruction queue 41. The first instruction queue 41 reads an instruction contained in the first instruction queue 41. The control logic 49 reads instructions contained in the second instruction queue 42 and the third instruction queue 43 and identifies the instruction to be executed to determine an address of the memory at which an instruction to be read next resides. Then, if the instruction to be executed is of 16-bit length, transition to [state 2] occurs and if the instruction is of 32-bit length, transition to [state 0] occurs.

Figure 8:
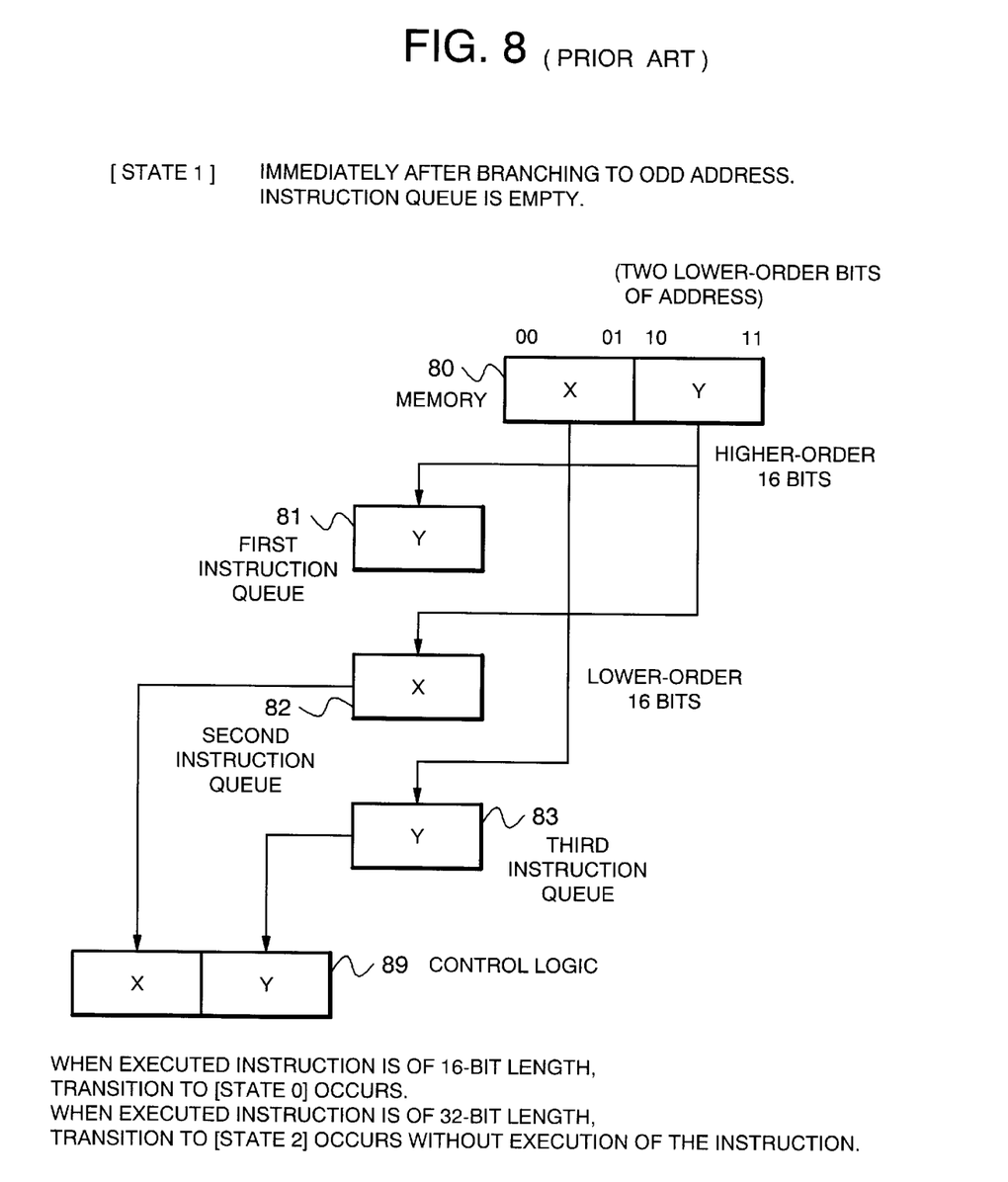
FIG. 8 is a diagram showing an example of state of an instruction queue whose transition occurs according to a length of an instruction to be executed.

Thereafter, it is assumed that a jump instruction is issued to branch into an odd address. In this case, the instruction queue enters [state 1], so that the third instruction queue 43 reads higher-order 16 bits of the memory 40 as illustrated in FIG. 8. The second instruction queue 42 reads lower-order bits of the memory 40. The first instruction queue 41 reads higher-order bits of the memory 40. The control logic 49 reads instructions contained in the second instruction queue 42 and the third instruction queue 43 and identifies the instruction to be executed to determine an address of the memory at which an instruction to be read next resides.

Then, if the instruction to be executed is of 16-bit length, transition to [state 0] occurs and if the instruction is of 32-bit length, transition to [state 2] occurs without execution of the instruction because it is not correctly stored in the control logic 49.

Thus using an instruction queue enables efficient execution of instructions of different lengths in each cycle, except when a 32-bit instruction is to be executed after branching into an odd address as illustrated in FIG. 8.

The immediate generator 47 expands a code of an immediate part of an instruction format to 32-bit immediate data. More specifically, the code expanded part of 32-bit immediate data is buried with the same value as that of a code bit of the original immediate. With an instruction of 16-bit length, an immediate part of the instruction contained in the third instruction queue 43 is sent to lower-order bits of the immediate generator 47 through the fourth selector 417 to generate immediate data whose code is expanded. With an instruction of 32-bit length, an immediate part of the instruction contained in the second instruction queue 42 is sent to lower-order bits of the immediate generator 47 and an immediate part of the instruction contained in the third instruction queue 43 to higher-order bits of the immediate generator 47 to generate immediate data whose code is expanded. The arithmetic unit 48 performs arithmetic of the immediate data whose code has been expanded and which is sent from the immediate generator 47 and outputs results.

One of conventional data processing units of this kind is a pre-fetch unit disclosed, for example, in the literature "V Series Microcomputer II" (edited under the supervision of Ryoichi Mori, Microcomputer Series 18, Maruzen Co., Ltd. pp. 33). This literature recites a data processing unit (pre-fetch unit) capable of pre-fetching a 16-bit instruction and comprised of a pre-fetch queue, which is a buffer for storing instructions pre-fetched by a bus control unit, and an aligner which is a data alignment system for aligning, at the time of sending an op code and an addressing mode field to an instruction decode unit through an internal bus, the code and the field to a fixed position on the bus.

Another conventional data processing unit is an instruction pre-fetch buffer disclosed in the literature "Computer Architecture: A Quantitative Approach" (written by Hennessy and Patterson, Nikkei BP, pp. 456–457). This literature recites a data processing unit (instruction pre-fetch buffer) capable of aligning instructions of variable lengths by holding 8-byte continuous instructions and pre-fetching a subsequent instruction every time the instructions are executed at CPU one by one. In the data processing unit, a directed bit is attached to every byte to represent the number of continuous bytes holding an effective instruction. In addition, while the most significant byte can be correlated with an arbitrary byte address, the remaining bytes should be continuous.

Still another conventional data processing unit is an instruction fetching technique disclosed in the literature "Computer Organization & Design: The Hardware/Software Interface (written by Patterson and Hennessy, Nikkei BP, pp. 334–335). This literature describes data processing (instruction fetch) realized by reading an instruction from an instruction memory by using an address in a program counter and writing the instruction to a pipeline register. In this processing, the address in the program counter is carried by four and re-written to the program counter to be ready for next clock cycle. In addition, in order to deal with any instruction to come next, the carried address is also stored in the pipeline register.

Figure 4:
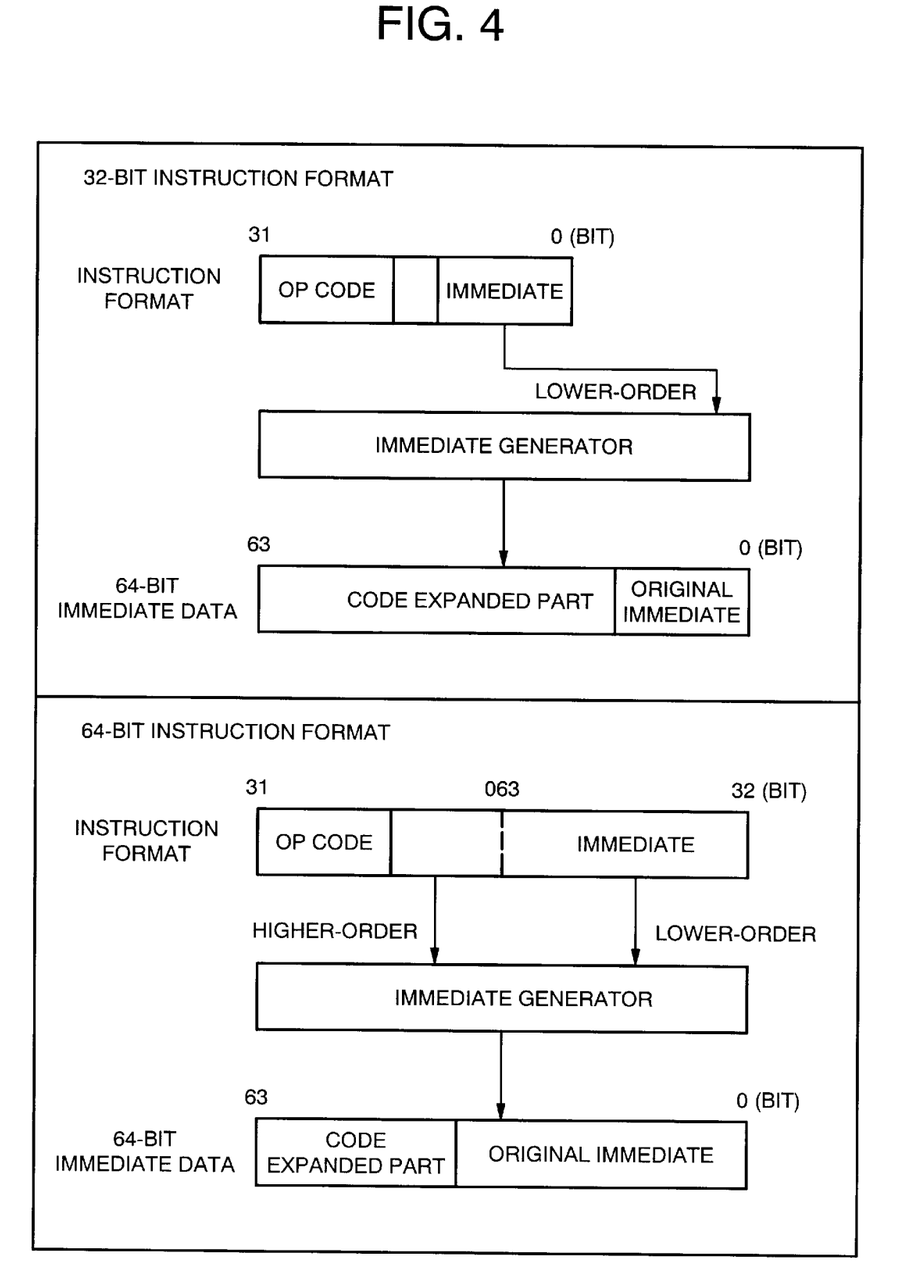
FIG. 4 is a diagram showing examples of instruction formats in a data processing unit of the second embodiment.

The above-described conventional data processing units, however, have a shortcoming that transmission of immediate data costs too much time to enable high-speed processing because a wire length running from an instruction queue to an immediate arithmetic unit can not be shortened. The reason why a wire length can not be shortened is that since position of immediate data varies with a length of an instruction, sending immediate data from an instruction queue to an immediate generator at the time of code expansion requires a wire running from the instruction queue to higher-order bits of the immediate generator and a wire running from the instruction queue to lower-order bits of the immediate generator. Therefore, with any arrangement of instruction queues, it is necessary to provide wires running in parallel to the direction of bit arrangement of the immediate generator as illustrated in FIG. 4, resulting in an increase in a wire length by the distance of the direction.

In addition, at the time of wiring an electronic circuit, it is necessary to ensure, between adjacent wires, a minimum pitch derived from manufacturing constraints or a minimum distance required to prevent adjacent wires from being affected by signal change. When a wire from an instruction queue to an immediate generator includes a wire part parallel to the direction of bit arrangement of the immediate generator as described above, the distance between the instruction queue and the immediate generator is constrained by a bundle of wires provided in that direction, whereby increase in a wire length is inevitable.

SUMMARY OF THE INVENTION

An object of the present invention is to provide a data processing unit which realizes high-speed data processing by eliminating the necessity of providing wires in parallel to the direction of bit arrangement of an immediate generator to eliminate an immediate data transmission delay time caused due to the passage of immediate data through a wire portion running in parallel to the direction of bit arrangement of the immediate generator.

According to one aspect of the invention, a data processing unit which pre-fetches a desired instruction from a memory storing a plurality of instructions of different lengths to generate immediate data and transfer the same to an arithmetic unit, comprises instruction pre-fetching means for pre-fetching an instruction from said memory; and immediate generating means for receiving input of immediate data of an instruction held by the instruction pre-fetching means to generate data whose bit size is larger than or equal to that of the immediate data of the instruction;

wherein said instruction pre-fetching means includes a pair of instruction queues for storing the same instruction provided in duplication corresponding to higher-order bits and lower-order bits of said immediate generating means, and applies immediate data of an instruction held in said instruction queue corresponding to higher-order bits of said immediate generating means to higher-order bits of said immediate generating means and immediate data of an instruction held in said instruction queue corresponding to lower-order bits of said immediate generating means to lower-order bits of said immediate generating means.

The instruction pre-fetching means may include a pair of instruction queues which receive input of instructions of 16-bit length or 32-bit length and correspond to higher-order 16 bits and lower-order 16 bits of said immediate generating means, when an instruction held by said pre-fetching means is of 16-bit length, apply immediate data of an instruction held in said instruction queue provided corresponding to lower-order 16 bits to lower-order 16 bits of said immediate generating means, and when an instruction held by said pre-fetching means is of 32-bit length, apply immediate data of an instruction held in said instruction queue provided corresponding to higher-order 16 bits to higher-order 16 bits of said immediate generating means and immediate data of an instruction held in said instruction queue provided corresponding to lower-order 16 bits to lower-order 16 bits of said immediate generating means.

The instruction pre-fetching means may include a pair of instruction queues which receive input of instructions of 32-bit length or 64-bit length and correspond to higher-order 32 bits and lower-order 32 bits of said immediate generating means, when an instruction held by said pre-fetching means is of 32-bit length, apply immediate data of an instruction held in said instruction queue provided corresponding to lower-order 32 bits to lower-order 32 bits of said immediate generating means, and when an instruction held by said pre-fetching means is of 64-bit length, apply immediate data of an instruction held in said instruction queue provided corresponding to higher-order 32 bits to higher-order 32 bits of said immediate generating means and immediate data of an instruction held in said instruction queue provided corresponding to lower-order 32 bits to lower-order 32 bits of said immediate generating means.

According to another aspect of the invention, a data processing unit which pre-fetches a desired instruction from a memory storing a plurality of instructions of different lengths to generate immediate data and transfer the same to an arithmetic unit, comprises instruction pre-fetching means for pre-fetching an instruction from said memory; and immediate generating means for receiving input of immediate data of an instruction held by the instruction pre-fetching means to generate data whose bit size is larger than or equal to that of the immediate data of the instruction;

wherein said instruction pre-fetching means includes a pair of instruction queue circuits having a plurality of instruction queues and storing the same instruction which are provided in duplication corresponding to higher-order bits and lower-order bits of said immediate generating means, and applies immediate data of an instruction held in said instruction queue circuit corresponding to higher-order bits of said immediate generating means to higher-order bits of said immediate generating means and immediate data of an instruction held in said instruction queue circuit corresponding to lower-order bits of said immediate generating means to lower-order bits of said immediate generating means.

In the preferred construction, the pair of instruction queue circuits of said instruction pre-fetching means are arranged in line corresponding to higher-order bit position and lower-order bit position of said immediate generating circuit.

The instruction pre-fetching means may include a pair of instruction queue circuits which receive input of instructions of 16-bit length or 32-bit length and correspond to higher-order 16 bits and lower-order 16 bits of said immediate generating means being arranged in line corresponding to higher-order bit position and lower-order bit position of said immediate generating circuit, when an instruction held by said pre-fetching means is of 16-bit length, apply immediate data of an instruction held in said instruction queue circuit provided corresponding to lower-order 16 bits to lower-order 16 bits of said immediate generating means, and when an instruction held by said pre-fetching means is of 32-bit length, apply immediate data of the instruction held in said instruction queue circuit provided corresponding to higher-order 16 bits to higher-order 16 bits of said immediate generating means and immediate data of an instruction held in said instruction queue circuit provided corresponding to lower-order 16 bits to lower-order 16 bits of said immediate generating means.

The instruction pre-fetching means may include a pair of instruction queue circuits which receive input of instructions of 32-bit length or 64-bit length and correspond to higher-order 32 bits and lower-order 32 bits of said immediate generating means being arranged in line corresponding to higher-order bit position and lower-order bit position of said immediate generating circuit, when an instruction held by said pre-fetching means is of 32-bit length, apply immediate data of an instruction held in said instruction queue circuit provided corresponding to lower-order 32 bits to lower-order 32 bits of said immediate generating means, and when an instruction held by said pre-fetching means is of 64-bit length, apply immediate data of an instruction held in said instruction queue circuit provided corresponding to higher-order 32 bits to higher-order 32 bits of said immediate generating means and immediate data of an instruction held in said instruction queue circuit provided corresponding to lower-order 32 bits to lower-order 32 bits of said immediate generating means.

In another preferred construction, the pair of instruction queue circuits of said instruction pre-fetching means are arranged in line corresponding to higher-order bit position and lower-order bit position of said immediate generating circuit, said instruction queue circuit corresponding to higher-order bits of said immediate generating means includes a first selector, a first memory queue, a second selector, a second memory queue, a third selector and a third memory queue, and said instruction queue circuit corresponding to lower-order bits of said immediate generating means includes a fourth selector, a fourth memory queue, a fifth selector, a fifth memory queue, a sixth selector and a sixth memory queue, and which further comprises a seventh selector between said instruction queue circuit corresponding to lower-order bits of said immediate generating means and said immediate generating means, and wherein in said instruction queue circuit corresponding to higher-order bits of said immediate generating means, said first selector sends an instruction sent from said memory or said first instruction queue to said first instruction queue, said first instruction queue reads an instruction sent from said first selector and sends the instruction to said second selector, said second selector sends an instruction sent from said memory or said first instruction queue to said second instruction queue, said second instruction queue reads an instruction sent from said second selector and sends the instruction to said third selector and a control logic which controls said first to seventh selectors, said third selector sends an instruction sent from said memory, said first instruction queue or said second instruction queue to said third instruction queue, and said third instruction queue reads an instruction sent from said third selector and sends the instruction to said control logic and immediate data of the instruction to higher-order bits of said immediate generating means, and in said instruction queue circuit corresponding to lower-order bits of said immediate generating means said fourth selector sends an instruction sent from said memory or said fourth instruction queue to said fourth instruction queue, said fourth instruction queue reads an instruction sent from said fourth selector and sends the instruction to said fifth selector, said fifth selector sends an instruction sent from said memory or said fourth instruction queue to said fifth instruction queue, said fifth instruction queue reads an instruction sent from said fifth selector and sends the instruction to said sixth selector and immediate data of the instruction directly to lower-order bits of said immediate generating means, said sixth selector sends an instruction sent from said memory, said fourth instruction queue or said fifth instruction queue to said sixth instruction queue, and said sixth instruction queue reads an instruction sent from said sixth selector and sends immediate data of the instruction to lower-order bits of said immediate generating means through said seventh selector.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
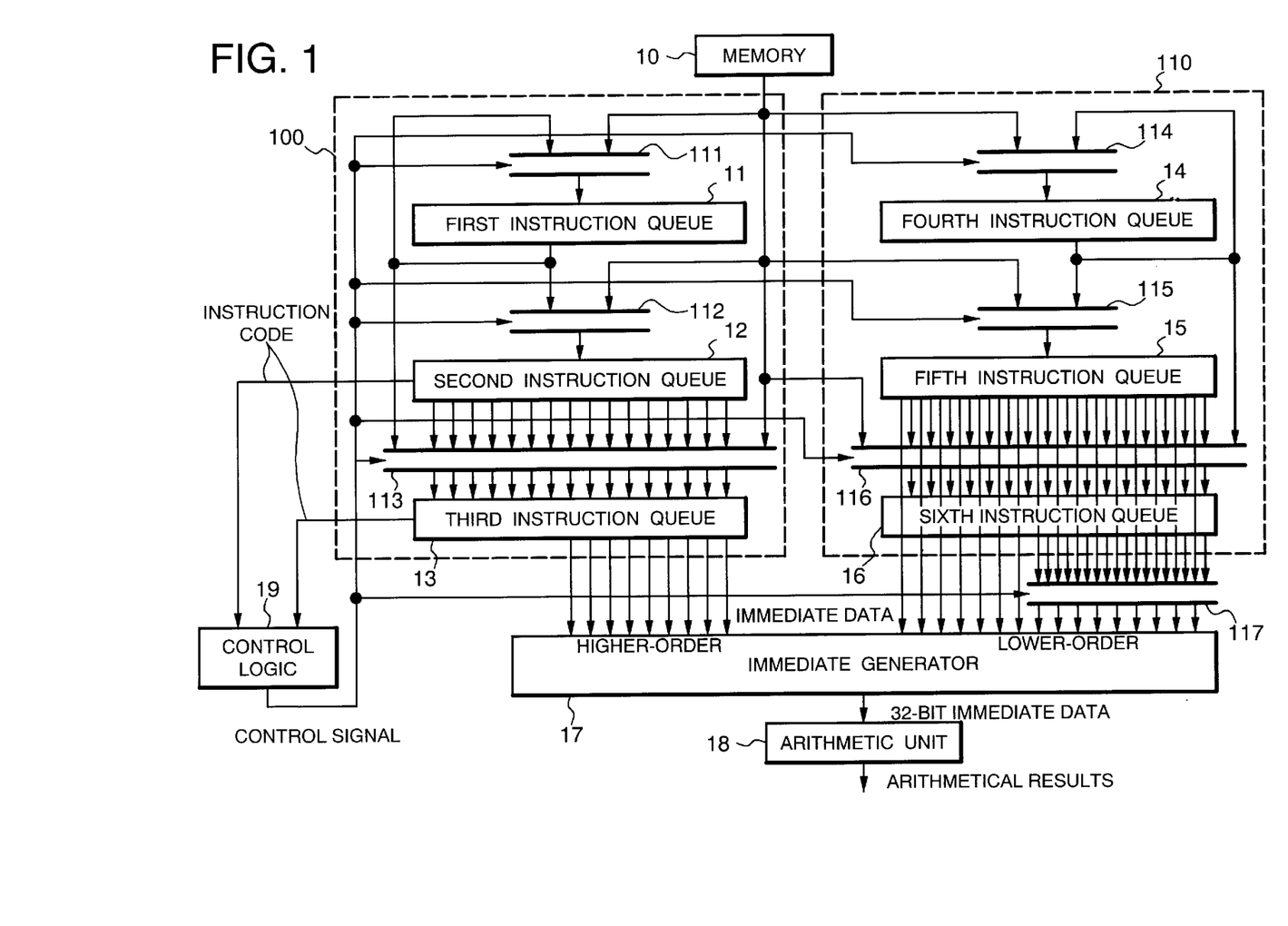
FIG. 1 is a block diagram showing layout of a data processing unit according to a first embodiment of the present invention.

FIG. 1 is a block diagram showing layout of structure, from an instruction queue to an immediate generator, of a data processing unit according to a first embodiment of the present invention.

With reference to FIG. 1, the data processing unit of the present embodiment includes a memory 10, an instruction queue circuit 100 including a first instruction queue 11, a second instruction queue 12 and a third instruction queue 13, and a first selector 111, a second selector 112 and a third selector 113, an instruction queue circuit 110 including a fourth instruction queue 14, a fifth instruction queue 15 and a sixth instruction queue 16, and a fourth selector 114, a fifth selector 115 and a sixth selector 116, a control logic 19, an immediate generator 17 and an arithmetic unit 18. As shown in the figure, this data processing unit has the layout in which the instruction queue circuit 100 and the instruction queue circuit 110 are provided in duplication, with the instruction queue circuit 100 disposed corresponding to the position of higher-order bits of the immediate generator 17 and the instruction queue circuit 110 to the position of lower-order bits.

The first instruction queue 11 of the instruction queue circuit 100 reads an instruction sent from the first selector 111 and sends the instruction to the second selector 112. The second instruction queue 12 reads an instruction sent from the second selector 112 and sends the instruction to the third selector 113 and the control logic 19. The third instruction queue 13 reads an instruction sent from the third selector 113 and sends the instruction to the control logic 19, as well as sending immediate data to higher-order bits of the immediate generator 17.

The first selector 111 sends an instruction sent from the memory 10 or the first instruction queue 11 to the first instruction queue 11. The second selector 112 sends an instruction sent from the memory 10 or the first instruction queue 11 to the second instruction queue 12. The third selector 113 sends an instruction sent from the memory 10, the first instruction queue 11 or the second instruction queue 12 to the third instruction queue 13.

The fourth instruction queue 14 of the instruction queue circuit 110 reads an instruction sent from the fourth selector 114 and sends the instruction to the fifth selector 115. The fifth instruction queue 15 reads an instruction sent from the fifth selector 115 and sends the instruction to the sixth selector 116, as well as directly sending immediate data to lower-order bits of the immediate generator 17. The sixth instruction queue 16 reads an instruction sent from the sixth selector 116 and sends immediate data to lower-order bits of the immediate generator 17 through the seventh selector 117.

The fourth selector 114 sends an instruction sent from the memory 10 or the fourth instruction queue 14 to the fourth instruction queue 14. The fifth selector 115 sends an instruction sent from the memory 10 or the fourth instruction queue 14 to the fifth instruction queue 15. The sixth selector 116 sends an instruction sent from the memory 10, the fourth instruction queue 14 or the fifth instruction queue 15 to the sixth instruction queue 16.

The seventh selector 117 sends immediate data sent from the fifth instruction queue 15 or immediate data sent from the sixth instruction queue 16 to lower-order bits of the immediate generator 17.

The immediate generator 17 expands codes of immediate data received from the seventh selector 117, the third instruction queue 13 of the instruction queue circuit 100 and the fifth instruction queue of the instruction queue circuit 110 to a bit width of an arithmetical unit of the arithmetic unit 18 and sends the immediate data to the arithmetic unit 18.

The arithmetic unit 18 performs arithmetic based on immediate data sent from the immediate generator 17 and outputs arithmetical results.

The control logic 19 receives instructions from the second instruction queue 12 and the third instruction queue 13 to output signals for controlling output of the first selector 111, the second selector 112, the third selector 113, the fourth selector 114, the fifth selector 115, the sixth selector 116 and the seventh selector 117.

Next, description will be made of operation of the data processing unit according to the present embodiment shown in FIG. 1 with reference to the drawings.

Figure 2:
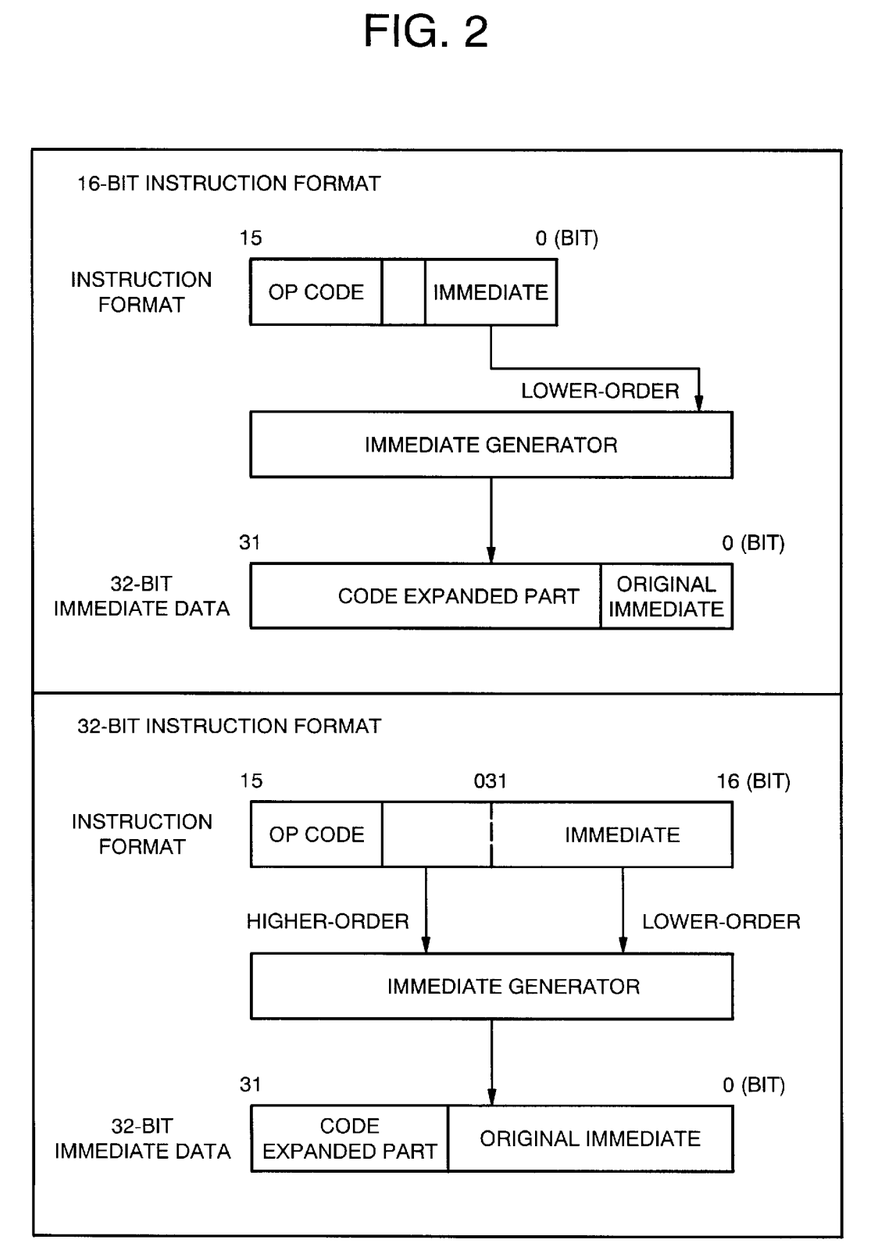
FIG. 2 is a diagram showing examples of instruction formats in the data processing unit according to the first embodiment.

In the following description, it is assumed that the data processing unit of the present embodiment is capable of processing instructions of different lengths of 16 bits and 32 bits as illustrated in FIG. 2 and that the arithmetical unit of the arithmetic unit 18 is 32 bits. As shown in the above-described memory map of FIG. 6, instructions A to Y which are divided every 16 bits are stored in the memory 10. One address of the memory 10 is composed of 8 bits and an even address indicates that a leading address of an instruction is a multiple of 4 and an odd address indicates that a leading address of an instruction is not a multiple of 4.

The instruction queue circuit 100 has four states, [state 0] of FIG. 7, [state 1] of FIG. 8, [state 2] of FIG. 9 and [state 3] of FIG. 10 according to a length of an instruction to be executed. Switching to each state is conducted by the first selector 111, the second selector 112 and the third selector 113 of FIG. 1.

According to the memory map of FIG. 6, since the initial address is even-numbered, the instruction queue enters [state 0]. At this state, the third instruction queue 13 reads lower-order 16 bits of the memory 10 and the second instruction queue 12 reads higher-order 16 bits of the memory 10 as shown in FIG. 7. The first instruction queue 11 reads higher-order 16 bits of the memory 10. The control logic 19 reads instructions contained in the second instruction queue 12 and the third instruction queue 13 and identifies the instruction to be executed to determine an address of the memory at which an instruction to be read next resides.

When an instruction to be executed is of 16-bit length, transition to [state 2] occurs and when it is of 32-bit length, transition to [state 0] occurs.

It is now assumed that a 16-bit instruction is executed to cause transition to [state 2]. The third instruction queue 13 reads an instruction contained in the first instruction queue 11 as shown in FIG. 9. The second instruction queue 12 reads lower-order 16 bits of the memory 10. The first instruction queue 11 reads higher-order 16 bits of the memory 10. The control logic 19 reads instructions contained in the second instruction queue 12 and the third instruction queue 13 and identifies the instruction to be executed to determine an address of the memory 10 at which an instruction to be read next resides.

When the instruction to be executed is of 16-bit length, transition to [state 3] occurs and when it is of 32-bit length, transition to [state 2] occurs.

It is assumed here that a 16-bit instruction is executed to cause transition to [state 3]. As shown in FIG. 10, the third instruction queue 13 reads an instruction contained in the second instruction queue 12. The second instruction queue 12 reads an instruction contained in the first instruction queue 11. Then, the first instruction queue 11 reads an instruction contained in the first instruction queue 11. The control logic 19 reads instructions contained in the second instruction queue 12 and the third instruction queue 13 and identifies the instruction to be executed to determine an address of the memory 10 at which an instruction to be read next resides.

When the instruction to be executed is of 16-bit length, transition to [state 2] occurs and when it is of 32-bit length, transition to [state 0] occurs.

Thereafter, when a jump instruction is issued to branch into an odd address, the third instruction queue 13 reads higher-order 16 bits of the memory 10 as shown in FIG. 8. The second instruction queue 12 reads lower-order bits of the memory 10. The first instruction queue 11 reads higher-order bits of the memory 10. Then, the control logic 19 reads instructions contained in the second instruction queue 12 and the third instruction queue 13 and identifies the instruction to be executed to determine an address of the memory 10 at which an instruction to be read next resides.

When the instruction to be executed is of 16-bit length, transition to [state 0] occurs. With an instruction of 32-bit length, transition to [state 2] occurs without execution of the instruction because the instruction is not properly stored in the control logic 19.

By thus using instruction queues, it is possible to efficiently execute instructions of different lengths in each cycle, except when a 32-bit instruction is to be executed after branching into an odd address as illustrated in FIG. 8.

In this data processing unit, the fourth instruction queue 14 and the first instruction queue 11, the fifth instruction queue 15 and the second instruction queue 12, the sixth instruction queue 16 and the third instruction queue 13, the fourth selector 114 and the first selector 111, the fifth selector 115 and the second selector 112, and the sixth selector 116 and the third selector 113 correspond to each other, respectively, and they are controlled by the control logic 19 to receive the same instruction at any time.

The immediate generator 17, as shown in FIG. 2, expands a code of an immediate part of an instruction format to 32-bit immediate data. More specifically, a code expanded part of 32-bit immediate data is buried with the same value as that of a code bit of the original immediate. As shown in FIG. 1, when an instruction is of 16-bit length, an immediate part of the instruction contained in the sixth instruction queue 16 is sent to lower-order bits of the immediate generator 17 through the seventh selector 117 to generate immediate data whose code is expanded. On the other hand, when an instruction is of 32-bit length, an immediate part of the instruction contained in the fifth instruction queue 15 is sent to lower-order bits of the immediate generator 17 and an immediate part of the instruction contained in the third instruction queue 13 is sent to higher-order bits of the immediate generator 17 to generate immediate data whose code is expanded. The arithmetic unit 18 performs arithmetic of immediate data whose code has been expanded and which is sent from the immediate generator 17 to output arithmetical results.

As described in the foregoing, since the data processing unit according to the first embodiment of the present invention is provided with separate instruction queues in duplication for higher-order bits and lower-order bits of the immediate generator 17, it is unnecessary to provide wires in parallel to the direction of bit arrangement of an immediate generator which are necessary for conventional data processing units. This enables elimination of an immediate data transmission delay time caused by the passage of immediate data on wires running in parallel to the direction of bit arrangement of the immediate generator, thereby realizing high-speed data processing.

In addition, since eliminating the need to provide wires in parallel to the direction of bit arrangement of an immediate generator, which have been conventionally required, makes it unnecessary to ensure a distance between adjacent wires for providing wires in parallel to the direction of bit arrangement of an immediate generator, a distance between an instruction queue and the immediate generator can be reduced to accordingly shorten a wire length between the instruction queue and the immediate generator, thereby further enhancing speed-up of data processing.

Next, the second embodiment of the present invention will be described with reference to FIGS. 3 and 4.

The data processing unit of the present embodiment has such 32-bit and 64-bit instruction formats as illustrated in FIG. 4. FIG. 3 shows layout of the structure, from an instruction queue to an immediate generator, of the data processing unit according to the second embodiment.

Figure 3:
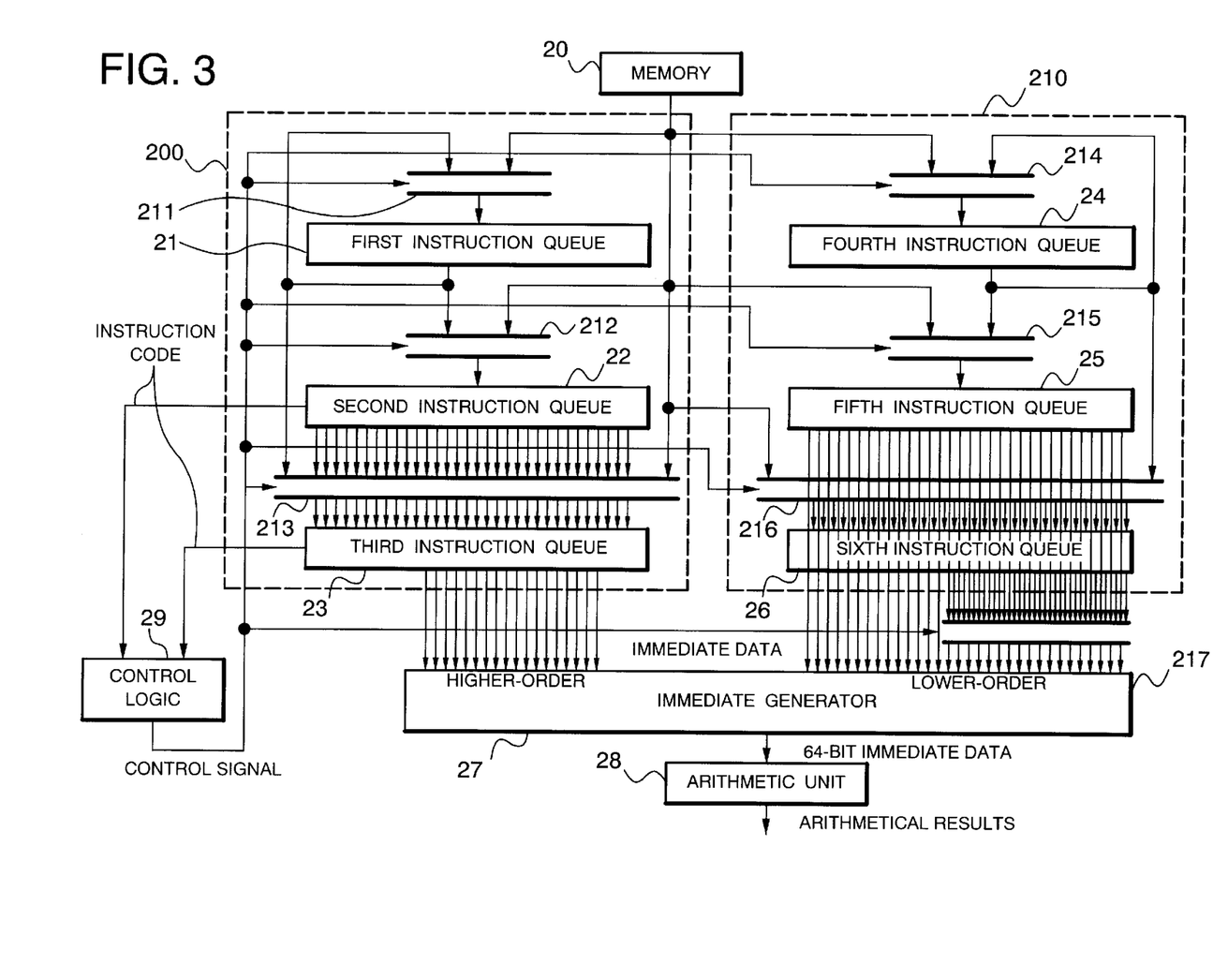
FIG. 3 is a block diagram showing layout of a data processing unit according to a second embodiment of the present invention.

With reference to FIG. 3, the data processing unit of the present embodiment includes, a memory 20, an instruction queue circuit 200 including a first instruction queue 21, a second instruction queue 22 and a third instruction queue 23, and a first selector 211, a second selector 212 and a third selector 213, an instruction queue circuit 210 including a fourth instruction queue 24, a fifth instruction queue 25 and a sixth instruction queue 26, and a fourth selector 214, a fifth selector 215 and a sixth selector 216, a control logic 29, an immediate generator 27 and an arithmetic unit 28. As illustrated in the figure, the data processing unit has layout in which, like the data processing unit of the first embodiment, the instruction queue circuit 200 and the instruction queue circuit 210 are provided in duplication, with the instruction queue circuit 200 disposed corresponding to higher-order bits of the immediate generator 27 and the instruction queue circuit 210 disposed corresponding to lower-order bits of the immediate generator 27.

The data processing unit of the second embodiment differs from that of the first embodiment in having 32-bit and 64-bit instruction formats as shown in FIG. 4, immediate data output by the immediate generator 27 being 64 bits, and a bit width of each wire being accordingly double that of the wire of the first embodiment. The remaining basic layout and operation are the same as those of the first embodiment.

In addition to the effect produced by the first embodiment, the second embodiment has the advantage of dealing with an immediate of a large value.

As described in the foregoing, since the data processing unit of the present invention is structured to have separate instruction queues provided in duplication for higher-order bits and lower-order bits of an immediate generator, it is unnecessary to provide wires in parallel to the direction of bit arrangement of the immediate generator which are necessary for conventional data processing units. This enables elimination of an immediate data transmission delay time caused by the passage of immediate data on wires running in parallel to the direction of bit arrangement of the immediate generator, thereby realizing high-speed data processing.

In addition, since eliminating the need to provide wires in parallel to the direction of bit arrangement of an immediate generator, which have been conventionally required, makes it unnecessary to ensure a distance between adjacent wires for providing wires in parallel to the direction of bit arrangement of the immediate generator, a distance between an instruction queue and the immediate generator can be reduced to accordingly shorten a wire length between the instruction queue and the immediate generator, thereby further enhancing speed-up of data processing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data processing unit which pre-fetches a desired instruction from a memory storing a plurality of instructions of different lengths to generate immediate data and transfer the same to an arithmetic unit, comprising:

instruction pre-fetching means for pre-fetching an instruction from said memory; and immediate generating means for receiving input of immediate data of an instruction held by the instruction pre-fetching means to generate data whose bit size is larger than or equal to that of the immediate data of the instruction;

wherein said instruction pre-fetching means includes a pair of instruction queues for storing the same instruction provided in duplication corresponding to higher-order bits and lower-order bits of said immediate generating means, and applies immediate data of an instruction held in said instruction queue corresponding to higher-order bits of said immediate generating means to higher-order bits of said immediate generating means and immediate data of an instruction held in said instruction queue corresponding to lower-order bits of said immediate generating means to lower-order bits of said immediate generating means.

2. The data processing unit as set forth in claim 1, wherein said instruction pre-fetching means includes a pair of instruction queues which receive input of instructions of 16-bit length or 32-bit length and correspond to higher-order 16 bits and lower-order 16 bits of said immediate generating means, when an instruction held by said pre-fetching means is of 16-bit length, applies immediate data of an instruction held in said instruction queue provided corresponding to lower-order 16 bits to lower-order 16 bits of said immediate generating means, and when an instruction held by said pre-fetching means is of 32-bit length, applies immediate data of an instruction held in said instruction queue provided corresponding to higher-order 16 bits to higher-order 16 bits of said immediate generating means and immediate data of an instruction held in said instruction queue provided corresponding to lower-order 16 bits to lower-order 16 bits of said immediate generating means.

3. The data processing unit as set forth in claim 1, wherein said instruction pre-fetching means includes a pair of instruction queues which receive input of instructions of 32-bit length or 64-bit length and correspond to higher-order 32 bits and lower-order 32 bits of said immediate generating means, when an instruction held by said pre-fetching means is of 32-bit length, applies immediate data of an instruction held in said instruction queue provided corresponding to lower-order 32 bits to lower-order 32 bits of said immediate generating means, and when an instruction held by said pre-fetching means is of 64-bit length, applies immediate data of an instruction held in said instruction queue provided corresponding to higher-order 32 bits to higher-order 32 bits of said immediate generating means and immediate data of an instruction held in said instruction queue provided corresponding to lower-order 32 bits to lower-order 32 bits of said immediate generating means.

4. A data processing unit which pre-fetches a desired instruction from a memory storing a plurality of instructions of different lengths to generate immediate data and transfer the same to an arithmetic unit, comprising:

instruction pre-fetching means for pre-fetching an instruction from said memory; and immediate generating means for receiving input of immediate data of an instruction held by the instruction pre-fetching means to generate data whose bit size is larger than or equal to that of the immediate data of the instruction;

wherein said instruction pre-fetching means includes a pair of instruction queue circuits having a plurality of instruction queues and storing the same instruction which are provided in duplication corresponding to higher-order bits and lower-order bits of said immediate generating means, and applies immediate data of an instruction held in said instruction queue circuit corresponding to higher-order bits of said immediate generating means to higher-order bits of said immediate generating means and immediate data of an instruction held in said instruction queue circuit corresponding to lower-order bits of said immediate generating means to lower-order bits of said immediate generating means.

5. The data processing unit as set forth in claim 4, wherein said pair of instruction queue circuits of said instruction pre-fetching means are arranged in line corresponding to higher-order bit position and lower-order bit position of said immediate generating circuit.

6. The data processing unit as set forth in claim 4, wherein said instruction pre-fetching means includes a pair of instruction queue circuits which receive input of instructions of 16-bit length or 32-bit length and correspond to higher-order 16 bits and lower-order 16 bits of said immediate generating means, when an instruction held by said pre-fetching means is of 16-bit length, applies immediate data of an instruction held in said instruction queue circuit provided corresponding to lower-order 16 bits to lower-order 16 bits of said immediate generating means, and when an instruction held by said pre-fetching means is of 32-bit length, applies immediate data of an instruction held in said instruction queue circuit provided corresponding to higher-order 16 bits to higher-order 16 bits of said immediate generating means and immediate data of an instruction held in said instruction queue circuit provided corresponding to lower-order 16 bits to lower-order 16 bits of said immediate generating means.

7. The data processing unit as set forth in claim 4, wherein said instruction pre-fetching means includes a pair of instruction queue circuits which receive input of instructions of 16-bit length or 32-bit length and correspond to higher-order 16 bits and lower-order 16 bits of said immediate generating means being arranged in line corresponding to higher-order bit position and lower-order bit position of said immediate generating circuit, when an instruction held by said pre-fetching means is of 16-bit length, applies immediate data of an instruction held in said instruction queue circuit provided corresponding to lower-order 16 bits to lower-order 16 bits of said immediate generating means, and when an instruction held by said pre-fetching means is of 32-bit length, applies immediate data of the instruction held in said instruction queue circuit provided corresponding to higher-order 16 bits to higher-order 16 bits of said immediate generating means and immediate data of an instruction held in said instruction queue circuit provided corresponding to lower-order 16 bits to lower-order 16 bits of said immediate generating means.

8. The data processing unit as set forth in claim 4, wherein said instruction pre-fetching means includes a pair of instruction queue circuits which receive input of instructions of 32-bit length or 64-bit length and correspond to higher-order 32 bits and lower-order 32 bits of said immediate generating means, when an instruction held by said pre-fetching means is of 32-bit length, applies immediate data of an instruction held in said instruction queue circuit provided corresponding to lower-order 32 bits to lower-order 32 bits of said immediate generating means, and when an instruction held by said pre-fetching means is of 64-bit length, applies immediate data of an instruction held in said instruction queue circuit provided corresponding to higher-order 32 bits to higher-order 32 bits of said immediate generating means and immediate data of an instruction held in said instruction queue circuit provided corresponding to lower-order 32 bits to lower-order 32 bits of said immediate generating means.

9. The data processing unit as set forth in claim 4, wherein said instruction pre-fetching means includes a pair of instruction queue circuits which receive input of instructions of 32-bit length or 64-bit length and correspond to higher-order 32 bits and lower-order 32 bits of said immediate generating means being arranged in line corresponding to higher-order bit position and lower-order bit position of said immediate generating circuit, when an instruction held by said pre-fetching means is of 32-bit length, applies immediate data of an instruction held in said instruction queue circuit provided corresponding to lower-order 32 bits to lower-order 32 bits of said immediate generating means, and when an instruction held by said pre-fetching means is of 64-bit length, applies immediate data of an instruction held in said instruction queue circuit provided corresponding to higher-order 32 bits to higher-order 32 bits of said immediate generating means and immediate data of an instruction held in said instruction queue circuit provided corresponding to lower-order 32 bits to lower-order 32 bits of said immediate generating means.

10. The data processing unit as set forth in claim 4, wherein, of said pair of instruction queue circuits of said instruction pre-fetching means, said instruction queue circuit corresponding to higher-order bits of said immediate generating means includes a first selector, a first memory queue, a second selector, a second memory queue, a third selector and a third memory queue, and said instruction queue circuit corresponding to lower-order bits of said immediate generating means includes a fourth selector, a fourth memory queue, a fifth selector, a fifth memory queue, a sixth selector and a sixth memory queue, and which further comprises a seventh selector between said instruction queue circuit corresponding to lower-order bits of said immediate generating means and said immediate generating means, and wherein in said instruction queue circuit corresponding to higher-order bits of said immediate generating means, said first selector sends an instruction sent from said memory or said first instruction queue to said first instruction queue, said first instruction queue reads an instruction sent from said first selector and sends the instruction to said second selector, said second selector sends an instruction sent from said memory or said first instruction queue to said second instruction queue, said second instruction queue reads an instruction sent from said second selector and sends the instruction to said third selector and a control logic which controls said first to seventh selectors, said third selector sends an instruction sent from said memory, said first instruction queue or said second instruction queue to said third instruction queue, and said third instruction queue reads an instruction sent from said third selector and sends the instruction to said control logic and immediate data of the instruction to higher-order bits of said immediate generating means, and in said instruction queue circuit corresponding to lower-order bits of said immediate generating means said fourth selector sends an instruction sent from said memory or said fourth instruction queue to said fourth instruction queue, said fourth instruction queue reads an instruction sent from said fourth selector and sends the instruction to said fifth selector, said fifth selector sends an instruction sent from said memory or said fourth instruction queue to said fifth instruction queue, said fifth instruction queue reads an instruction sent from said fifth selector and sends the instruction to said sixth selector and immediate data of the instruction directly to lower-order bits of said immediate generating means, said sixth selector sends an instruction sent from said memory, said fourth instruction queue or said fifth instruction queue to said sixth instruction queue, and said sixth instruction queue reads an instruction sent from said sixth selector and sends immediate data of the instruction to lower-order bits of said immediate generating means through said seventh selector.

11. The data processing unit as set forth in claim 4, wherein said pair of instruction queue circuits of said instruction pre-fetching means are arranged in line corresponding to higher-order bit position and lower-order bit position of said immediate generating circuit, said instruction queue circuit corresponding to higher-order bits of said immediate generating means includes a first selector, a first memory queue, a second selector, a second memory queue, a third selector and a third memory queue, and said instruction queue circuit corresponding to lower-order bits of said immediate generating means includes a fourth selector, a fourth memory queue, a fifth selector, a fifth memory queue, a sixth selector and a sixth memory queue, and which further comprises a seventh selector between said instruction queue circuit corresponding to lower-order bits of said immediate generating means and said immediate generating means, and wherein in said instruction queue circuit corresponding to higher-order bits of said immediate generating means, said first selector sends an instruction sent from said memory or said first instruction queue to said first instruction queue, said first instruction queue reads an instruction sent from said first selector and sends the instruction to said second selector, said second selector sends an instruction sent from said memory or said first instruction queue to said second instruction queue, said second instruction queue reads an instruction sent from said second selector and sends the instruction to said third selector and a control logic which controls said first to seventh selectors, said third selector sends an instruction sent from said memory, said first instruction queue or said second instruction queue to said third instruction queue, and said third instruction queue reads an instruction sent from said third selector and sends the instruction to said control logic and immediate data of the instruction to higher-order bits of said immediate generating means, and in said instruction queue circuit corresponding to lower-order bits of said immediate generating means said fourth selector sends an instruction sent from said memory or said fourth instruction queue to said fourth instruction queue, said fourth instruction queue reads an instruction sent from said fourth selector and sends the instruction to said fifth selector, said fifth selector sends an instruction sent from said memory or said fourth instruction queue to said fifth instruction queue, said fifth instruction queue reads an instruction sent from said fifth selector and sends the instruction to said sixth selector and immediate data of the instruction directly to lower-order bits of said immediate generating means, said sixth selector sends an instruction sent from said memory, said fourth instruction queue or said fifth instruction queue to said sixth instruction queue, and said sixth instruction queue reads an instruction sent from said sixth selector and sends immediate data of the instruction to lower-order bits of said immediate generating means through said seventh selector.

* * * * *